No. 755,838. PATENTED MAR. 29, 1904.
G. W. BEAM.
GRAIN HARVESTER ELEVATOR.
APPLICATION FILED FEB. 13, 1903.
NO MODEL. 3 SHEETS—SHEET 1.
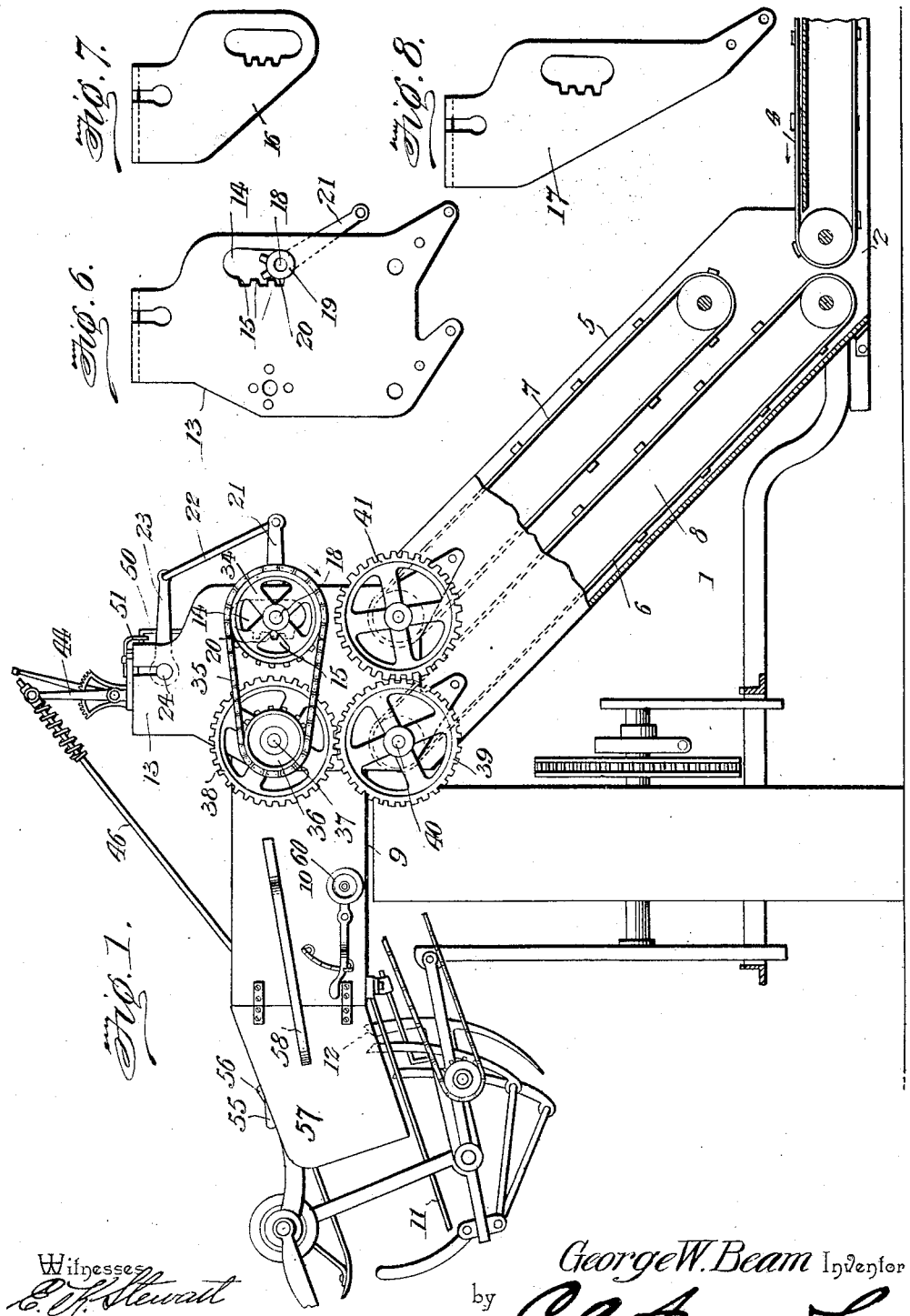

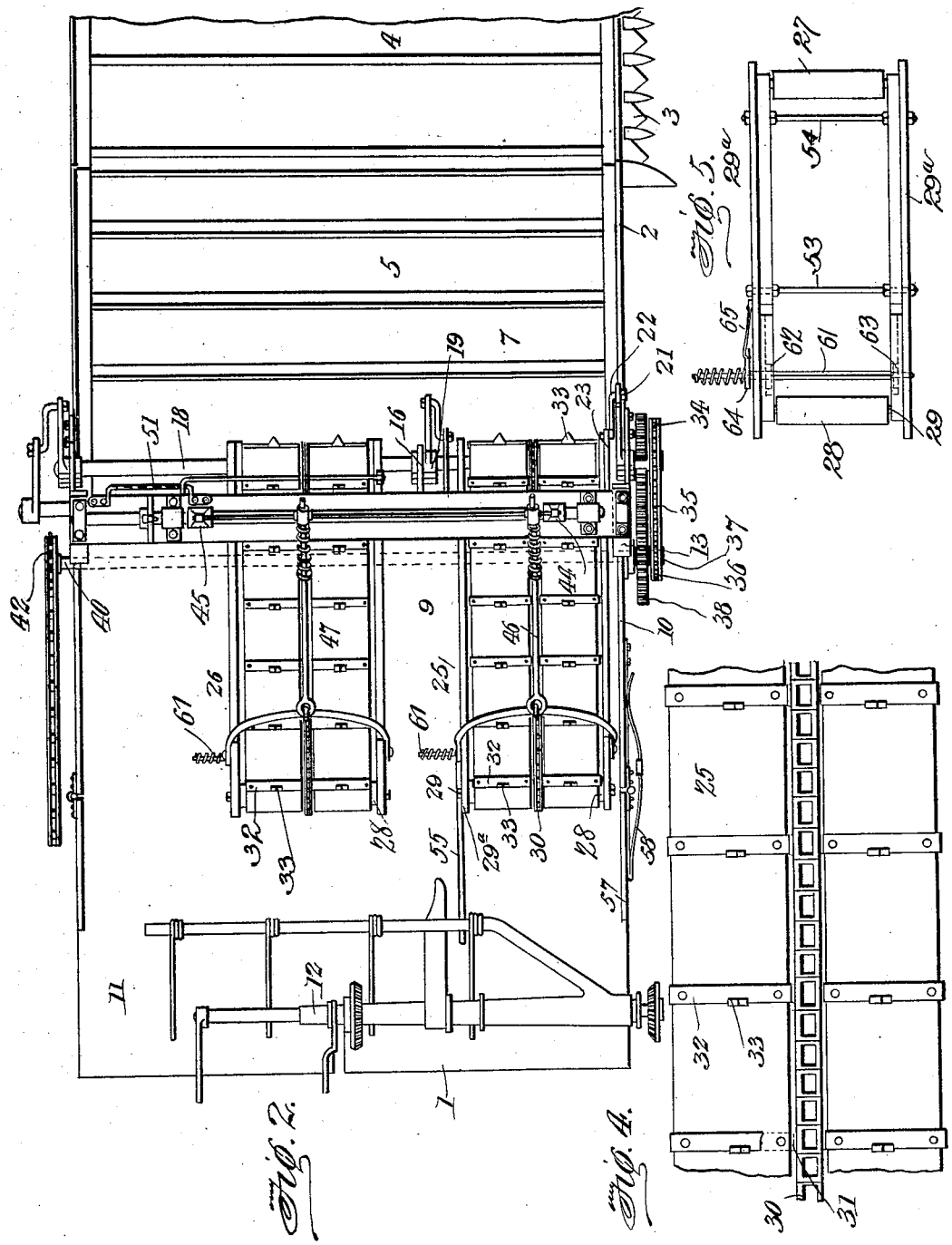

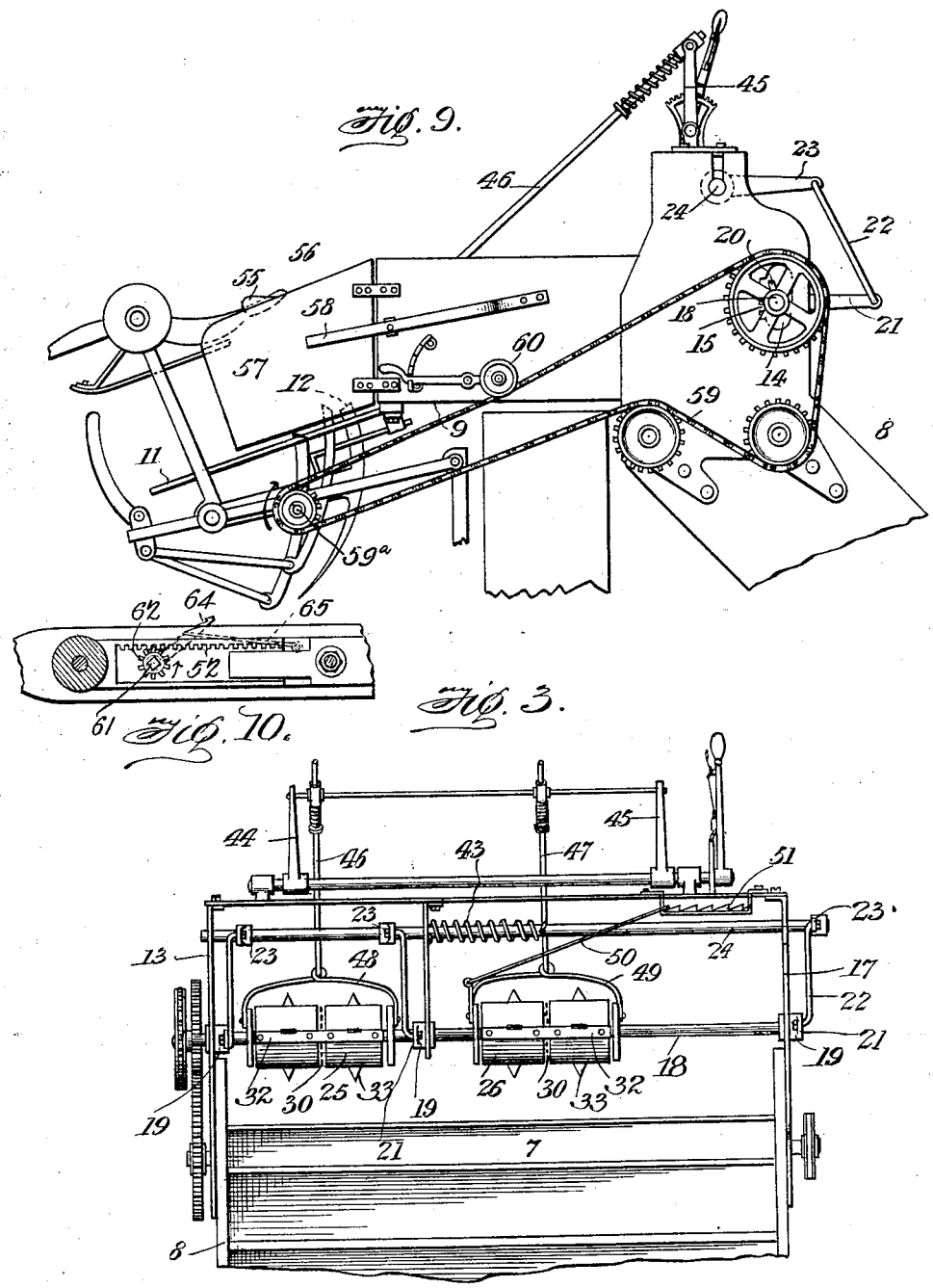

No. 755,838. Patented March 29, 1904.

UNITED STATES PATENT OFFICE.

GEORGE WASHINGTON BEAM, OF ROBINSON, ILLINOIS.

GRAIN-HARVESTER ELEVATOR.

SPECIFICATION forming part of Letters Patent No. 755,838, dated March 29, 1904.

Application filed February 13, 1903. Serial No. 143,244. (No model.)

*To all whom it may concern:*

Be it known that I, GEORGE WASHINGTON BEAM, a citizen of the United States, residing at Robinson, in the county of Crawford and State of Illinois, have invented a new and useful Grain-Harvester Elevator, of which the following is a specification.

My invention relates to grain-harvester elevators—such, for example, as illustrated in Letters Patent of the United States No. 637,918, granted to me November 28, 1899—and has for its object to improve the construction and operation of the delivery-carriers or conveyers which move the grain across the horizontal upper portion of the elevator-frame and deliver it onto the binder deck or table to be acted upon by the binding mechanism with the primary object of rendering the said conveyers automatically adjustable vertically to accord with the varying quantities of grain delivered by the elevators onto the table beneath the carriers.

To these ends the invention comprises, in a harvester, the combination, with the grain elevator and binding mechanism, of a device for transferring grain from the former to the latter and means adapted to maintain the device in contact with the grain and to yield under the influence of an increase of grain, whereby the device will automatically adjust itself to varying quantities of grain.

The invention further comprises the details of construction and combination of parts more fully hereinafter described.

In the accompanying drawings, Figure 1 is a front elevation of a portion of a harvesting-machine having my improvement embodied therein. Fig. 2 is a top plan view of the same. Fig. 3 is a side sectional elevation as viewed from the grain side of the machine. Fig. 4 is a plan view of one of the conveyer-belts. Fig. 5 is a plan view of one of the conveyer-frames. Figs. 6, 7, and 8 are elevations of the front, central, and rear brackets, respectively. Fig. 9 is a front elevation showing a modification of the device. Fig. 10 is a detail sectional elevation of the means for extending the conveyer-frames.

Referring to the drawings, 1 indicates a self-binding harvester of any desired construction, except in so far as my improvements thereon are concerned. This machine is provided with the usual platform 2, having at its front edge the cutting apparatus 3. 4 indicates an endless platform carrier sustained by the platform 2 and extending from end to end thereof and acting to carry the cut grain to the inclined elevator 5, which comprises two endless conveyers 6 and 7, suitably mounted in the elevator-frame 8 and adapted to convey the grain upward between them and deliver it onto the horizontal table 9, mounted in the upper horizontal portion 10 of the elevator-frame. The grain as it is delivered from the elevator is caught up and conveyed across the table 9 by an endless conveyer or delivery-carrier to be presently described and delivered to the binder deck or table 11, to be operated upon by the binding mechanism 12.

All of the above-mentioned parts of the machine are entirely foreign to the present invention and may therefore be of the construction and operate in a manner similar to the like parts illustrated and described in my patent above mentioned, or they may be of any other desired construction.

In applying my improvement I attach in any suitable manner to the upper end of the elevator-frame at the front of the machine a bearing plate or bracket 13, having formed therein an elongated vertical slot 14, provided at one side with teeth 15. At the transverse center and at the rear of the elevator-frame I mount in any suitable manner bracket-plates 16 and 17, both provided with a slot and teeth similar to the slot and teeth formed in the plate 13 and in alinement therewith.

18 is a transverse shaft extending across the elevator-frame and mounted in the slots 14 in the three bracket-plates. The shaft has loosely mounted thereon within the slots in the bearing-plates three rotary heads 19, mounted one in each slot and each provided with teeth 20, in mesh with the teeth 15 and with an integral substantially horizontal projecting arm 21, connected by a link 22 with a similar arm 23, fixed on a shaft 24, mounted in suitable bearings in the plates 13, 16, and 17 above the shaft 18 and extending transversely of the machine, all for the purpose hereinafter described.

25 and 26 indicate two endless delivery-carriers or conveyers mounted in the upper end of the elevator-frame horizontally of the same for conveying the grain from the elevator to the binder-deck. As both of these conveyers are identical in construction and operation, I will describe but one in detail.

27 is a roller fixed upon the shaft 18, to be driven thereby, and mounted upon this roller and supported and driven thereby is the endless conveyer 25, which is further sustained at its opposite end by a roller 28, mounted on a transverse shaft 29, journaled in the parallel side bars 29$^a$, which constitute the framework of the conveyer. This conveyer comprises a central drive-chain 30, provided at intervals with transversely elongated or extended links 31, to which are riveted or otherwise secured steel clips or plates 32, provided with fingers 33, projecting from their outer faces. These clips are of a length equal to the length of the links 31, to which they are riveted, and have the fingers 33 struck up from or otherwise formed upon them. The clips overlie the usual endless canvas belts or strips, which latter are seated between them and the links 31 and are thus protected from wear.

The shaft 18 is driven to impart motion to the conveyers 25 and 26, as follows: Fixed on the end of the shaft 18 at the front of the machine is a sprocket-wheel 34, connected by sprocket-chain 35 with a sprocket-pinion 36, mounted idly on a stud 37, projecting horizontally from the front face of the bracket-plate 13. There is also mounted on this stud and fixed to the sprocket-pinion for driving the same an idle gear 38, which in turn meshes with a gear 39, fixed on the end of the upper drive-shaft 40, which imparts motion to the elevating-conveyer 6, the companion conveyer 7 being driven by a gear 41, mounted on the shaft at its upper end and in mesh with the gear 39. The gear 39 is driven through the medium of a sprocket-wheel 42, mounted at the opposite end of shaft 40, this sprocket being in turn driven by the driving mechanism which operates the other parts of the machine. From this system of gearing it will be seen that the gear 39 imparts motion to the gear 38, which drives the sprocket-pinion fixed thereto, and consequently the sprocket-wheel 34, through the medium of the chain 35. When this mechanism is in operation, the sprocket-chain in driving sprocket 34 permits the shaft 18 to ride vertically upward and downward in the slot 14 and hold the conveyers 25 and 26 into contact with the grain. When the shaft is down to the bottom of the slot, if a greater flow of grain passes beneath the conveyer it will force the same upward, thus moving the shaft upward in the slot, the parts being assisted in this movement through the medium of a torsion-spring 43, mounted on shaft 24 with one of its ends fixed thereto and its other end fixed to the framework of the machine and tending normally to rotate the shaft upward and hold the arm 23 in an upwardly-extending position. The arm 23 being connected by the link 22 with arm 21 on shaft 18 will of course when lifted by spring 43 lift the lower shaft 18, thus causing the teeth 20 to travel upward on the teeth 15 and elevate the shaft vertically, as will be readily understood.

The conveyers 25 and 26 are supported at their receiving ends by the shaft 18 and are free to move vertically up and down to permit them to automatically adjust themselves to a varying flow of grain, as above described. The free or delivery ends of the conveyers are independently and floatingly sustained, as follows: 44 and 45 indicate two normally vertical arms mounted at their lower ends on a rod extending transversely across the upper portion of the elevator-frame. The rod carrying these arms is controlled in its movement by a suitable lever and is adapted to be operated to swing the arms downward toward the stubble side of the machine. 46 and 47 are spring-controlled rods connected to the upper ends of the arms and to bails 48 and 49, attached to the free ends of the respective conveyers 25 and 26 and extending transversely across the same. As the flow of grain beneath the conveyers increases or decreases the rods will move upward or downward, thus permitting a similar movement to the delivery ends of the conveyers. From this construction it will be readily seen that the ends of the conveyers are capable of an independent floating movement, and inasmuch as they act, respectively, on the heads and butts of the grain the grain will be delivered to the binding mechanism in a thoroughly straightened condition. The rear conveyer may be adjusted transversely of the machine to and from the front conveyer in order that the conveyers may act properly upon the heads and butts of varying lengths of grain to properly straighten the same before delivery to the binder-deck. While this conveyer may be provided with any suitable adjusting mechanism, I prefer to employ a rod 50, pivotally connected to the side frame of the conveyer and provided at its opposite end with a pawl engaging a rack 51. The conveyers are further susceptible of an automatic longitudinal adjustment in order to maintain their endless belts at the proper tension. For this purpose I form the side bars of the conveyers in two sections and provide the shorter section on each of its inner side faces with a longitudinal rack 52. 61 is a rod journaled in the side bars of the longer relatively immovable section of the conveyer-frame and adapted when rotated to operate pinions 62 and 63 in engagement with the racks 52. The rod 61 is extended at one end beyond the conveyer-frame and has mounted thereon a torsion-spring fixed at one end to the rod and at its other end to a pawl 64, mounted to turn freely on the rod. This pawl is normally locked by means of an arm 65, but may be released and rotated to wind and place the spring under tension, which latter, owing to its tendency to unwind, rotates the rod and pinions, as indicated by the arrow, to move the shorter section outward and maintain the belt yieldingly under tension.

53 and 54 are two rods which extend transversely of the conveyer and are double-nutted to its side bars for properly bracing the same.

55 is a finger projected from the delivery end of the front conveyer toward the binding mechanism and extending to a point overlapping the breastplate 56 to prevent overflowing of grain when the needle is in the knotter.

57 is the usual butt-board, hinged to the horizontal portion of the elevator-frame and adapted to engage and even up the butts of the grain in the usual manner. This board is controlled by a leaf-spring 58, attached at one end thereto and at the other end to the elevator-frame.

In the modification illustrated in Fig. 9 the construction and operation of all of the parts of the mechanism are identical to those above described, with the exception of the mechanism for driving the elevator conveyers 6 and 7 and the drive-shaft 18. In this figure the upper shaft of the conveyers 6 and 7 are each provided with a sprocket-wheel fixed thereto for driving the same and the respective conveyers. The shaft 18 is also provided with a sprocket-wheel. 59 is an endless sprocket-chain which passes over the sprocket on shaft 18 downward and beneath the sprocket on the shaft of conveyer 7, thence upward and around the upper side of the sprocket on conveyer 6. This chain is driven from a sprocket fixed to the end of a drive-shaft 59ª, which travels in the direction indicated by the arrow. 60 is an idler-sprocket mounted on a pivoted spring-controlled arm connected to the framework of the machine, the said sprocket being adapted to take up the slack in the chain 59 as the shaft 18 moves vertically upward and downward, thus maintaining substantially the same tension on the parts. It is here to be particularly noted that when this mechanism is in operation the chain 59 will exert a downward pull upon the shaft 18, thus drawing the latter vertically downward in the slot 14 and maintaining the receiving ends of the conveyers in yieldable contact with the grain, said shaft being adapted to move upward under the influence of an increased flow of grain in the manner as heretofore described. It will be observed that the sprocket on shaft 18 is one-third larger than the elevator-sprockets, thus driving the delivery-carriers at a rate of speed one-third slower than the rate at which the elevator-conveyers are driven. A similar variation of speed between these parts is provided for in the construction illustrated in Fig. 1. This difference in speed is maintained, for the reason that the elevator cannot deliver the grain to the carriers 25 and 26 as rapidly as they can transfer it to the binding mechanism when the parts are driven at the same rate of speed.

From the foregoing description it will be seen that I produce a device in which the conveyers for transferring the grain from the elevator to the binding mechanism will automatically adjust themselves to a varying flow of grain at their receiving ends, will be independently and floatingly sustained at the delivery ends, thus permitting them to bear with a varying pressure upon the heads and butts of the grain in order to straighten the same, and may be adjusted longitudinally of the grain to permit them to act properly on grain of varying lengths. In attaining these ends I do not limit or confine myself to the details herein shown and described, as various changes may be made therein without departing from the spirit or scope of my invention.

Having thus described the invention, what is claimed is—

1. In a harvester, the combination with the grain elevator and binding mechanism, of a device for transferring grain from the former to the latter, and means adapted to maintain both the receiving and delivery ends of the device in yieldable contact with the grain and permit it to yield under the influence of an increase of grain; whereby the device will automatically adjust itself to varying quantities of grain.

2. In a harvester, the combination with the grain elevator and binding mechanism, of an endless conveyer for transferring grain from the former to the latter, and means adapted to maintain both the receiving and delivery ends of the conveyer in yieldable contact with the grain and permit it to yield under the influence of an increase of grain; whereby the conveyer will automatically adjust itself to varying quantities of grain.

3. In a harvester, the combination with the grain elevator and binding mechanism, of a pair of traveling devices for transferring grain from the former to the latter and wholly movable one from the other longitudinally of the grain, and means for maintaining the devices in their adjusted positions longitudinally of the grain to adapt them for grain of varying lengths.

4. In a harvester, the combination with the grain elevator and binding mechanism, of a pair of endless traveling conveyers for transferring grain from the former to the latter and wholly movable one from the other longitudinally of the grain, and means for maintaining the conveyers in their adjusted positions longitudinally of the grain to adapt them for grain of varying lengths.

5. In a harvester, the combination with the grain elevator and binding mechanism, of a pair of endless traveling conveyers for transferring grain from the former to the latter and wholly movable one from the other longitudinally of the grain, and a pawl-and-rack mechanism for maintaining the conveyers in their adjusted positions longitudinally of the grain to adapt them for grain of varying lengths.

6. In a harvester, the combination with the grain elevator and binding mechanism, of a pair of conveyers for transferring grain from the former to the latter, means adapted to maintain the receiving ends of the conveyers in yieldable contact with the grain and permit them to yield under the influence of an increase of grain, and means for independently and floatingly sustaining the delivery ends of the conveyers to permit them to bear unequally and yieldably upon the heads and butts of the grain; whereby the conveyers will automatically adjust themselves to varying quantities of grain and will deliver the grain in a straightened condition to the binding mechanism.

7. In a harvester, the combination with the grain elevator and binding mechanism, of a pair of conveyers for transferring grain from the former to the latter, a vertically-movable shaft common to both conveyers on which their receiving ends are mounted, means acting on the shaft to maintain the receiving ends of the conveyers in yieldable contact with the grain and permit them to yield under the influence of an increase of grain, and means for independently and floatingly sustaining the delivery ends of the conveyers to permit them to bear unequally and yieldably upon the heads and butts of the grain; whereby the conveyers will automatically adjust themselves to varying quantities of grain and will deliver the grain in a straightened condition to the binding mechanism.

8. In a harvester, the combination with the grain elevator and binding mechanism, of a pair of devices for transferring grain from the former to the latter and movable one from the other longitudinally of the grain, means adapted to maintain the devices in contact with the grain and to yield under the influence of an increase of grain and means for maintaining the devices in their adjusted positions longitudinally of the grain; whereby the devices will automatically adjust themselves to varying quantities of grain and may be adjusted to grain of varying lengths.

9. In a harvester, the combination with the grain elevator and binding mechanism, of a pair of conveyers for transferring grain from the former to the latter and movable one from the other longitudinally of the grain, means adapted to maintain the conveyers in contact with the grain and to yield under the influence of an increase of grain, and means for maintaining the conveyers in their adjusted positions longitudinally of the grain; whereby the conveyers will automatically adjust themselves to varying quantities of grain and may be adjusted to grain of varying lengths.

10. In a harvester, the combination with the grain elevator and binding mechanism, of a pair of conveyers for transferring grain from the former to the latter and movable one from the other longitudinally of the grain, means adapted to maintain the conveyers in contact with the grain and to yield under the influence of an increase of grain, and a pawl-and-rack mechanism for maintaining the conveyers in their adjusted positions longitudinally of the grain; whereby the conveyers will automatically adjust themselves to varying quantities of grain, and may be adjusted to grain of varying lengths.

11. In a harvester, the combination with the grain elevator and binding mechanism, of a pair of devices for transferring grain from the former to the latter and movable one from the other longitudinally of the grain, means for sustaining the receiving ends of the devices and adapted to yield under the influence of an increase of grain, means for independently and floatingly sustaining the delivery ends of the devices, and means for maintaining the devices in their adjusted positions longitudinally of the grain; whereby the devices will automatically adjust themselves to varying quantities of grain, will deliver the grain in a straightened condition to the binding mechanism, and may be adjusted to grain of varying lengths.

12. In a harvester, the combination with the grain elevator and binding mechanism, of a pair of conveyers for transferring grain from the former to the latter and movable one from the other longitudinally of the grain, means for sustaining the receiving ends of the conveyers and adapted to yield under the influence of an increase of grain, means for independently and floatingly sustaining the delivery ends of the conveyers, and means for maintaining the conveyers in their adjusted positions longitudinally of the grain; whereby the conveyers will automatically adjust themselves to varying quantities of grain, will deliver the grain in a straightened condition to the binding mechanism, and may be adjusted to grain of varying lengths.

13. In a harvester, the combination with the grain elevator and binding mechanism, of a pair of conveyers for transferring grain from the former to the latter and movable one from the other longitudinally of the grain, a shaft common to both conveyers on which their receiving ends are mounted, means acting on the shaft to maintain the conveyers in contact with the grain and adapted to yield under the influence of an increase of grain, means for independently and floatingly sustaining the delivery ends of the conveyers, and means for maintaining the devices in their adjusted positions longitudinally of the grain.

14. In a harvester, the combination with the grain elevator and binding mechanism, of a pair of conveyers for transferring grain from the former to the latter and movable one from the other longitudinally of the grain, means adapted to maintain the receiving ends of the conveyers in contact with the grain and to yield under the influence of an increase of grain, means for independently and floatingly sustaining the delivery ends of the conveyers, and a pawl-and-rack mechanism for maintaining the conveyers in their adjusted positions longitudinally of the grain.

15. In a harvester, the combination with the grain elevator and binding mechanism, of a pair of conveyers for transferring grain from the former to the latter and movable one from the other longitudinally of the grain, a shaft common to both conveyers on which their receiving ends are mounted, means acting on the shaft to maintain the conveyers in contact with the grain and adapted to yield under the influence of an increase of grain, means for independently and floatingly sustaining the delivery ends of the conveyers, and a pawl-and-rack mechanism for maintaining the conveyers in their adjusted positions longitudinally of the grain.

16. In a harvester, the combination with the grain elevator and binding mechanism, of a pair of conveyers for transferring grain from the former to the latter, a vertically-movable shaft common to both conveyers on which their receiving ends are mounted, said shaft being movable upward automatically under the influence of an increase of grain, mechanism for driving the shaft, and means for independently and floatingly sustaining the delivery ends of the conveyers.

17. In a harvester, the combination with the grain elevator and binding mechanism, of a pair of conveyers for transferring grain from the former to the latter and movable one from the other longitudinally of the grain, a vertically-movable shaft common to both conveyers on which their receiving ends are mounted, said shaft being movable upward automatically under the influence of an increase of grain, mechanism for driving the shaft, means for independently and floatingly sustaining the delivery ends of the conveyers, and means for maintaining the conveyers in their adjusted positions longitudinally of the grain.

18. In a harvester, the combination with the grain elevator and binding mechanism, of a pair of conveyers for transferring grain from the former to the latter, a vertically-movable shaft common to both conveyers on which their receiving ends are mounted, mechanism for driving the shaft, means for exerting an upward pull on the shaft to adapt the conveyers to yield readily under the influence of an increased flow of grain and means for independently and floatingly sustaining the delivery ends of the conveyers.

19. In a harvester, the combination with the grain elevator and binding mechanism, of a pair of conveyers for transferring grain from the former to the latter and movable one from the other longitudinally of the grain, a vertically-movable shaft common to both conveyers on which their receiving ends are mounted, mechanism for driving the shaft, means exerting an upward pull on the shaft to adapt the conveyers to yield readily under the influence of an increased flow of grain, means for independently and floatingly sustaining the delivery ends of the conveyers, and means for maintaining the conveyers in their adjusted positions longitudinally of the grain.

20. In a harvester, the combination with the grain elevator and binding mechanism, of a pair of conveyers for transferring grain from the former to the latter and movable one from the other longitudinally of the grain, a vertically-movable shaft common to both conveyers on which their receiving ends are mounted, mechanism for driving the shaft, means exerting an upward pull on the shaft to adapt the conveyers to yield readily under the influence of an increased flow of grain means for independently and floatingly sustaining the delivery ends of the conveyers, and a pawl-and-rack mechanism for maintaining the conveyers in their adjusted positions longitudinally of the grain.

21. In a harvester, the combination with the grain elevator and binding mechanism, of a pair of conveyers for transferring grain from the former to the latter, a vertically-movable shaft common to both conveyers on which their receiving ends are mounted, mechanism for driving the shaft and exerting a downward pull on the same to maintain the conveyers in contact with the grain, said shaft being movable upward automatically under the influence of an increase of grain, and means for independently and floatingly sustaining the delivery ends of the conveyers.

22. In a harvester, the combination with the grain elevator and binding mechanism, of a pair of conveyers for transferring grain from the former to the latter, a vertically-movable shaft common to both conveyers on which their receiving ends are mounted, mechanism for driving the shaft and exerting a downward pull on the same to hold the conveyers yieldably in contact with the grain, means for exerting an upward pull on the shaft to adapt the conveyers to yield readily under the influence of an increased flow of grain, and means for independently and floatingly sustaining the delivery ends of the conveyers.

In testimony that I claim the foregoing as my own I have hereto affixed my signature in the presence of two witnesses.

GEORGE WASHINGTON BEAM.

Witnesses:
H. F. ROSEBROUGH,
E. E. LINDSAY.